(12) United States Patent
Littlefield et al.

(10) Patent No.: US 10,254,411 B2
(45) Date of Patent: Apr. 9, 2019

(54) GEO-LOCATION OF JAMMING SIGNALS

(71) Applicant: MBDA UK LIMITED, Stevenage, Hertfordshire (GB)

(72) Inventors: Colin Aaron Littlefield, Stevenage (GB); Timothy Whitworth, Nottingham (GB); Yeqiu Ying, Nottingham (GB); Graham Patrick Wallis, Stevenage (GB); Mark Dumville, Nottingham (GB)

(73) Assignee: MBDA UK LIMITED, Stevenage, Hertfordshire (GB)

( * ) Notice: Subject to any disclaimer, the term of this patent is extended or adjusted under 35 U.S.C. 154(b) by 347 days.

(21) Appl. No.: 14/916,646

(22) PCT Filed: Sep. 4, 2014

(86) PCT No.: PCT/GB2014/052670
§ 371 (c)(1),
(2) Date: Mar. 4, 2016

(87) PCT Pub. No.: WO2015/033138
PCT Pub. Date: Mar. 12, 2015

(65) Prior Publication Data
US 2016/0349375 A1 Dec. 1, 2016

(30) Foreign Application Priority Data

Sep. 5, 2013 (EP) ...................................... 13275201
Sep. 5, 2013 (GB) .................................. 1315839.9

(51) Int. Cl.
*G01S 19/21* (2010.01)
*G01S 5/06* (2006.01)
(Continued)

(52) U.S. Cl.
CPC .............. *G01S 19/215* (2013.01); *G01S 5/06* (2013.01); *G01S 19/03* (2013.01); *G01S 19/21* (2013.01); *H04K 3/22* (2013.01); *H04K 3/90* (2013.01)

(58) Field of Classification Search
CPC ........... G01S 5/06; G01S 19/215; H04K 3/22; H04K 3/90
See application file for complete search history.

(56) References Cited

U.S. PATENT DOCUMENTS 5,241,313 A * 8/1993 Shaw .................. G01S 13/9035
342/13
5,502,450 A * 3/1996 Zablotney ................. G01S 3/46
342/451
(Continued)

FOREIGN PATENT DOCUMENTS

EP 2 530 862 A1 12/2012

OTHER PUBLICATIONS

International Preliminary Report on Patentability and Written Opinion dated Mar. 17, 2016 from corresponding PCT/GB2014/052670.
(Continued)

*Primary Examiner* — Gregory C. Issing
(74) *Attorney, Agent, or Firm* — Scully, Scott, Murphy & Presser, P.C.

(57) ABSTRACT

A ground-based source of a jamming signal capable of disrupting a GNSS satellite-based navigation system, for example a GPS jammer, is located with a detector carried by a suitable platform, for example an airborne UAV or missile. The detector, when the platform is at a first location, measures a characteristic of the jamming signal. The platform and its detector are then moved to a chosen second location, from which a further measurement of the jamming signal is made. The measurements made by the detector are
(Continued)

then used to determine the location of the source of the jamming signal.

17 Claims, 12 Drawing Sheets

(51) Int. Cl.
*G01S 19/03* (2010.01)
*H04K 3/00* (2006.01)

(56) References Cited

U.S. PATENT DOCUMENTS

| | | | | |
|---|---|---|---|---|
| 5,526,001 A * | 6/1996 | Rose | ............... | G01S 1/026 342/442 |
| 5,767,804 A * | 6/1998 | Murphy | ............... | G01S 5/0036 342/357.31 |
| 6,300,898 B1 | 10/2001 | Schneider et al. | | |
| 6,567,044 B2 * | 5/2003 | Carroll | ............... | G01S 5/0081 342/357.34 |
| 6,839,017 B1 | 1/2005 | Dillman | | |
| 7,233,284 B2 | 6/2007 | Velicer et al. | | |
| 9,007,262 B1 * | 4/2015 | Witzgall | ............... | G01S 5/10 342/357.78 |
| 2002/0169578 A1 | 11/2002 | Yang | | |
| 2004/0233100 A1 * | 11/2004 | Dibble | ............... | G01S 5/0252 342/357.48 |
| 2005/0077424 A1 * | 4/2005 | Schneider | ............... | F41G 7/303 244/3.11 |
| 2007/0293150 A1 | 12/2007 | Ezal et al. | | |
| 2010/0007555 A1 | 1/2010 | Ezal et al. | | |
| 2010/0045506 A1 | 2/2010 | Law et al. | | |
| 2012/0143482 A1 * | 6/2012 | Goossen | ............... | G08G 5/0034 701/120 |
| 2012/0293371 A1 * | 11/2012 | Lu | ............... | G01S 1/04 342/387 |

OTHER PUBLICATIONS

International Search Report and Written Opinion dated Oct. 8, 2014 issued in PCT/GB2014/052670.
Extended European Search Report dated Feb. 26, 2014 issued in EP13275201.
GB Search Report dated Nov. 7, 2013 issued in GB1315839.9.
Brown, Alison et al., "Jammer and Interference Location System-Design and Initial Test Results", Technical Meeting ION-GPS, Sep. 14-17, 1999, pp. 137-142.

* cited by examiner

GEO-LOCATION OF JAMMING SIGNALS

BACKGROUND OF THE INVENTION

The present invention concerns a method and an apparatus for the geo-location of jamming signals. More particularly, but not exclusively, this invention concerns a method of locating a source of a jamming signal capable of disrupting a satellite-based navigation system, a detector for carrying out such a method, and a vehicle including such a detector.

Navigation and geo-location systems that rely on receiving and processing signals from satellites are readily disrupted by low powered and relative inexpensive jamming signal apparatus. Such jamming signal apparatus will typically be ground-based and will generate a signal with one or more components at sufficient power at frequencies that disrupt the correct reception (and isolation) of signals from the satellites. There is therefore a need to cope with such signal jammers.

U.S. Pat. No. 6,300,898 proposes a solution in which three airborne vehicles receive satellite GPS signals and retransmit GPS signals at sufficiently high-power as to defeat jamming by the typical low-power ground-based signal jammers. Such a solution is of course costly and often impractical for many applications, particularly those where speed of response is required.

U.S. Pat. No. 7,233,284 proposes a hand-held jammer locator device. The device operates by detecting a jamming signal with two spatially separated antennae which provide the device with the ability to output information on the strength and direction of the jamming signal. U.S. Pat. No. 7,233,284 discloses manual operation of the device by a user on the ground. No means or method of identifying the exact location of the jammer is explicitly disclosed in U.S. Pat. No. 7,233,284. U.S. Pat. No. 7,233,284 is also reliant on having two antennae to detect the direction from the device at which of the jamming signal source is located.

There are other proposals for GPS jamming location systems, such as the "GOPHER" system developed by SARA (Scientific Applications and Research Associates, Inc.). It is believed that the GOPHER system is one which can operate in a static configuration.

The present invention seeks to mitigate one or more of the above-mentioned problems. Alternatively or additionally, the present invention seeks to provide an improved method of locating a source of a jamming signal capable of disrupting a satellite-based navigation system. Alternatively or additionally, the present invention seeks to provide an improved signal jammer detector.

SUMMARY OF THE INVENTION

The present invention provides a method of locating a ground-based source of a jamming signal capable of disrupting a satellite-based navigation system, wherein the method comprises the following steps:
  using a detector at a first location to make one or more measurements of one or more characteristics of the jamming signal,
  choosing a second location from which one or more further measurements of one or more characteristics of the jamming signal are to be made by the detector, moving the detector from the first location to the second location,
  using the detector at the second location to make said one or more further measurements,
  choosing a third location from which one or more further measurements of one or more characteristics of the jamming signal are to be made by the detector, the third location being displaced from the straight line passing through both the first and second locations,
  moving the detector to the third location, using the detector at the third location to make yet further measurements of one or more characteristics of the jamming signal, and
  using measurements made by the detector of the one or more characteristics of the jamming signal to determine the location of the source of the jamming signal.

According to the invention there is also provided a detector comprising at least one antenna for measuring one or more characteristics of a jamming signal and being configured for use in any of the aspects of the method of the invention as described or claimed herein.

According to the invention there is also provided a vehicle including a detector comprising at least one antenna for measuring one or more characteristics of a jamming signal and being configured for use in any of the aspects of the method of the invention as described or claimed herein.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

The first embodiment of the invention is illustrated with reference to FIGS. 1 to 7 of the accompanying drawings.

Figure 1:
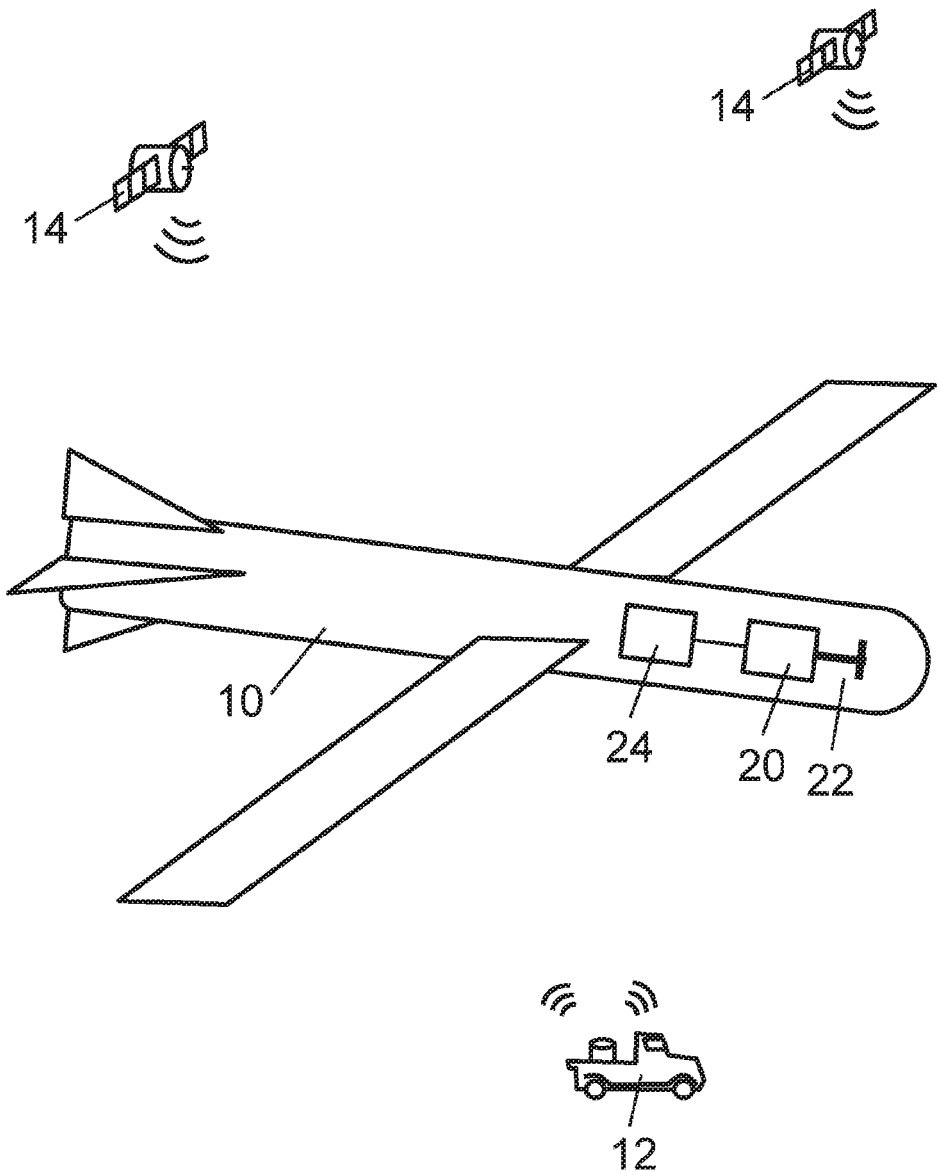
FIG. 1 shows a UAV performing a method of detecting a source of a GPS jammer signal according to a first embodiment of the invention.

FIG. 1 shows a UAV 10 during performance of the method of the first embodiment. Also shown in FIG. 1 are GPS satellites 14 and a source 12 of a GPS jammer signal (in this case a truck on the ground). The UAV 10 carries a detector 20 that has a single antenna 22 arranged for detecting the strength of a GPS jammer signal. The single detector 20 makes successive measurements in time at different locations. From such measurements a precise location of the GPS jammer signal source may be ascertained by using the relative differences in received jamming signal strengths. In the present embodiment, a front end apparatus is required that has the capability of detecting GPS jammer signals (and optionally other types of jammer signals) and which outputs digital samples. Whilst other front ends could readily be used, in this particular embodiment the detector 20 is based around the "MAX2769" Universal GPS Receiver from Maxim Integrated of 160 Rio Robles, San Jose, Calif. 95134 USA. The MAX2769 Receiver provides the capability to receive GPS, GLONASS, and Galileo signals and is one example of many such receivers which could be utilised by embodiments of the invention.

Figure 2:
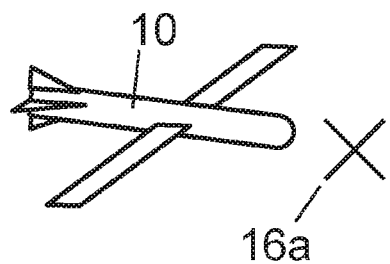
FIG. 2 shows the UAV of FIG. 1 performing a first measurement at a first location.
Figure 2:
Figure 3:
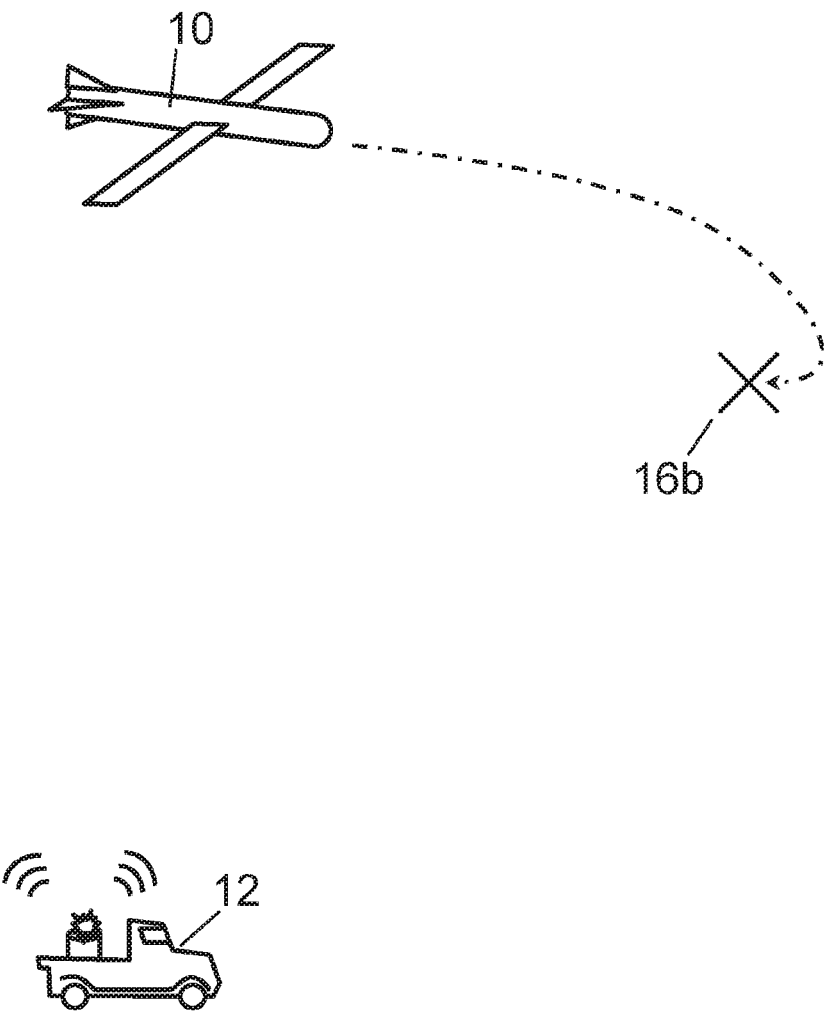
FIG. 3 shows the UAV of FIG. 1 moving towards a second location for the purpose of taking a second measurement.
Figure 4:
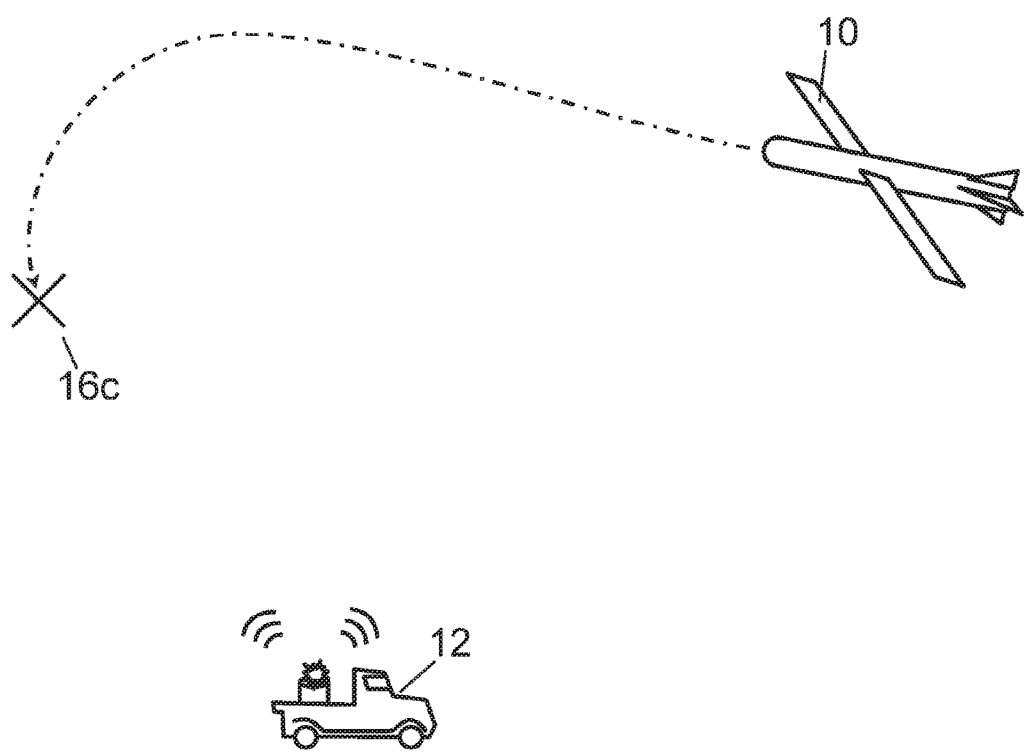
FIG. 4 shows the UAV of FIG. 1 moving towards a third location for the purpose of taking a third measurement.
Figure 5:
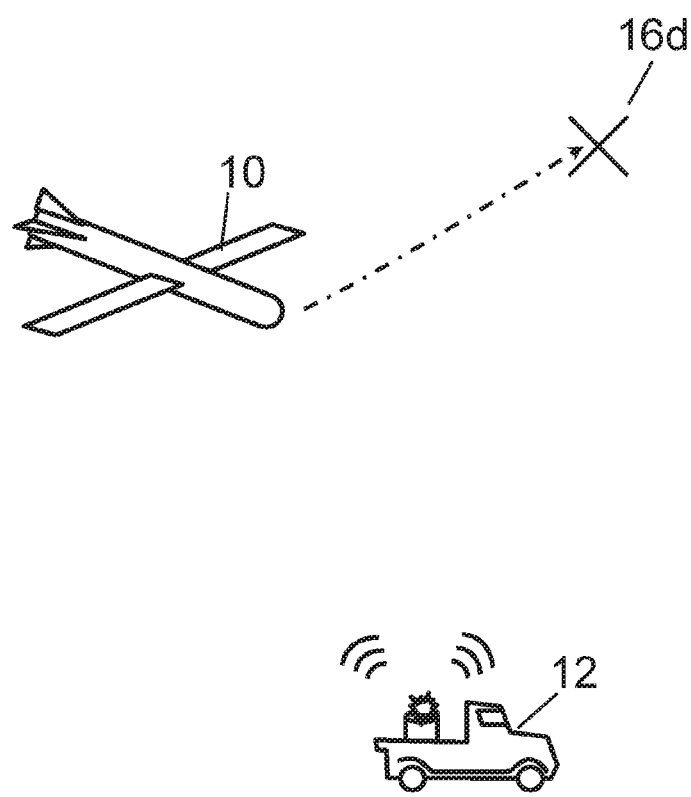
FIG. 5 shows the UAV of FIG. 1 moving towards a fourth location for the purpose of taking a fourth measurement.

FIG. 2 shows the UAV at a first location 16a making a first measurement of jammer signal strength. FIG. 3 shows the flight path of the UAV from the first location to a second location 16b at which a second measurement of jammer signal strength is made. FIG. 4 shows the flight path of the UAV from the second location to a third location 16c at which a third measurement of jammer signal strength is made. The third location is chosen so as to be displaced from the straight line passing through both the first and second locations. A processing unit 24 (which is programmed to perform the function of a jammer geo-location computation engine) on the UAV receives signals from the detector 20 and from the previous measurements made determines a new location for the UAV to manoeuvre to. FIG. 5 thus shows the UAV choosing a fourth location 16d from which to make another measurement, the fourth location 16d being one which the UAV can readily reach but which is also calculated to be a location from which a measurement may be made which will improve the accuracy of the predicted location of the jamming signal source, as compared to other locations which could also be readily reached by the UAV. The UAV thus manoeuvres to make measurements at different relative geometries to the jammer and modifies its flight path (within mission constraints) according to the instruction from the jammer geo-location computation engine.

Figure 6:
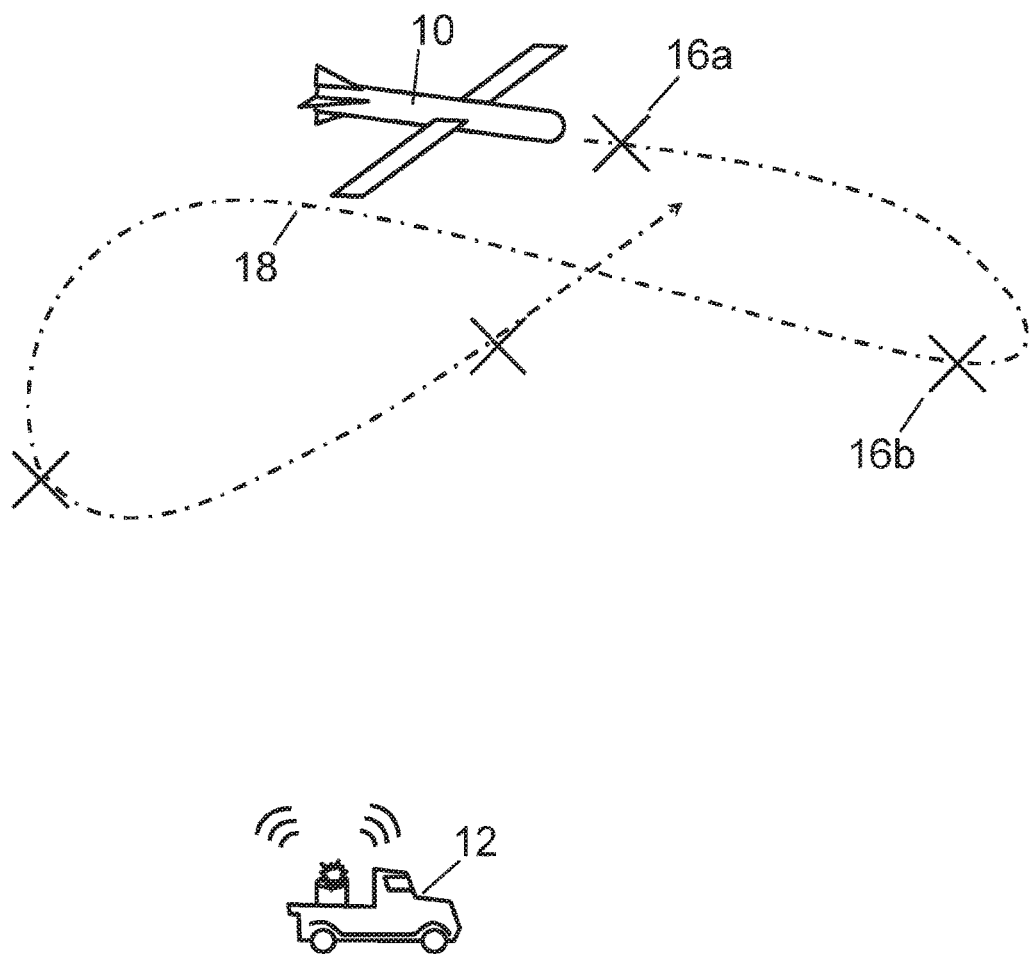
FIG. 6 shows the flight path of the UAV in taking the first to fourth measurements.
Figure 7:
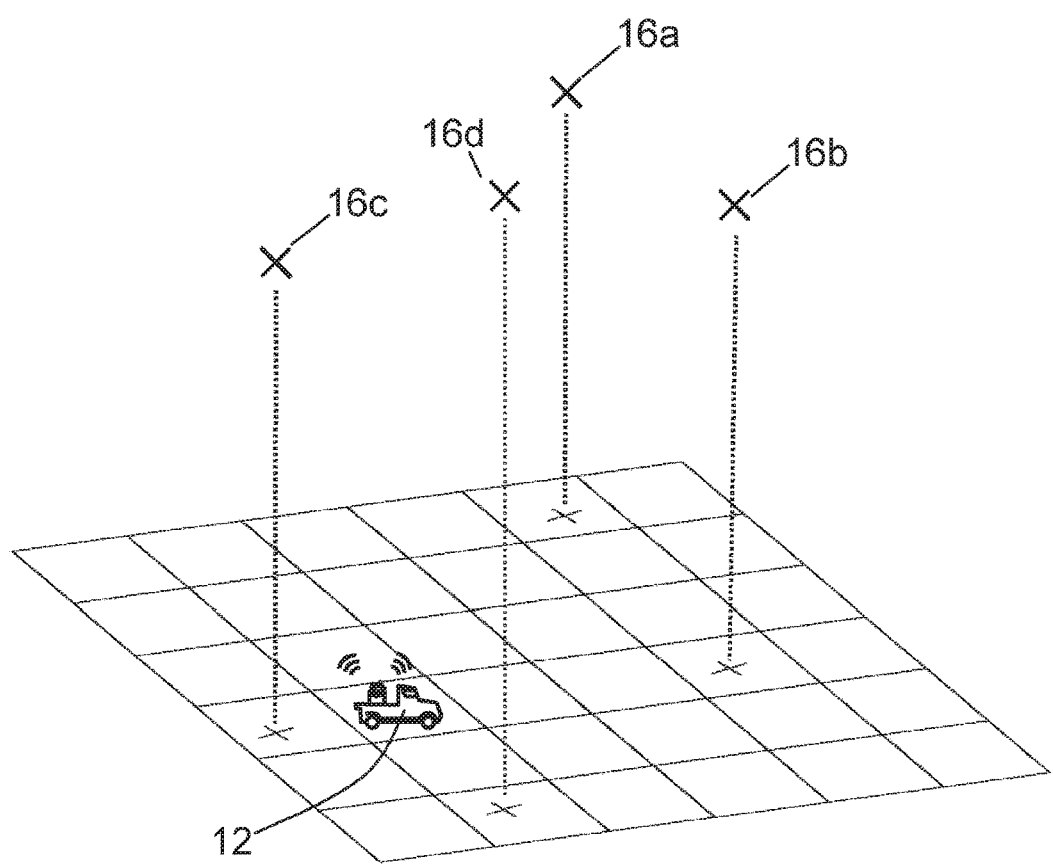
FIG. 7 shows the locations of the first to fourth measurements relative to the location of the source of the GPS jammer signal.

FIGS. 6 and 7 show the relative locations of the first to fourth locations 16a to 16d relative to the location of the jammer source 12. The drawings are not to scale and are highly schematic. The cruising speed of the UAV typically exceeds 50 ms$^{-1}$ (i.e. at least 180 kmh$^{-1}$).

Making more measurements with the UAV allows the position of the jammer 12 to be located progressively more precisely. If the jamming signal is assumed to have relatively isotropic properties and to be emitted with a relatively constant power output, making many measurements of the received strength of jammer signal at many different locations can readily provide the location of the jammer. The power received is proportional to the power emitted and the inverse square of the distance away. Four measurements of the signal strength at four different locations should thus be sufficient to enable the location of the jammer to be located. Any system delays and biases in the detector are differenced out over successive measurements, which further improves accuracy.

FIGS. 8a to 8f show visual representations of a sequence of probability grids that are calculated during performance of the method according to a second embodiment of the invention. The second embodiment differs from the first embodiment in that the method initially assumes that the jamming source can be at any one of a multiplicity of different locations. Effectively, the technique of the second embodiment may be viewed as assembling a "probability of geo-location" map based on the in-flight measurements of the jammer signal. The construction of the probability map is initially based on identifying a coarse approximate location of the jammer based on the initial detected jammer signals. The coarse approximate location is used as a centre point to formulate a grid of cells of potential jammer locations. Each cell represents a potential location of the jammer. Each cell is allocated a probability of the jamming source being located within that cell. The probability for each cell is calculated and updated with successive measurements. Given the number of unknowns and the variations in successive measurements that might result from other factors (including atmospheric conditions, environmental factors, jammer power variations, ground-based obstructions and/or type of terrain), there are many variables that can complicate the fast and precise calculation of the location of the jammer source. A suitable, knowledge based system, can learn with sufficient testing and data to compensate for such variables but the output of such a system is likely only to provide rough predictions of the location. By using, updating, and refining with successive measurements the "probability of geo-location" map a single likely location will typically emerge with time.

Figure 8A:
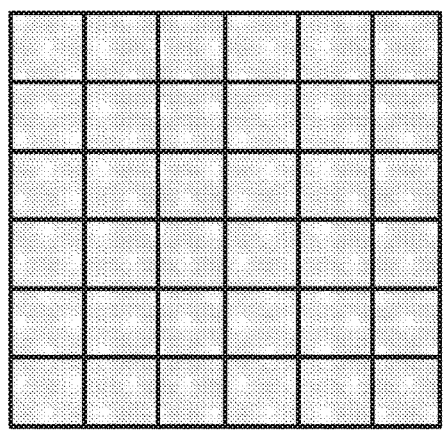
FIGS. 8a to 8f are visual representations of the probability grids calculated during performance of the method of a second embodiment.
Figure 8B:
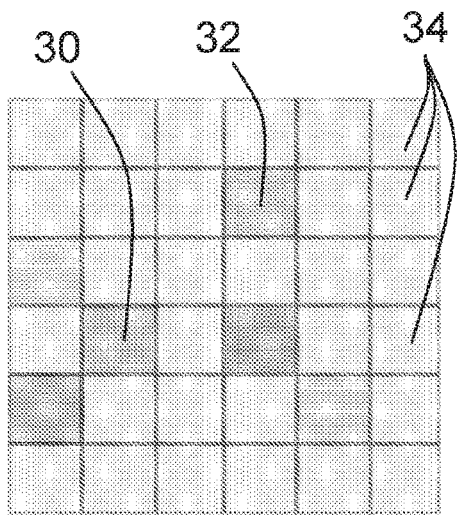
Figure 8C:
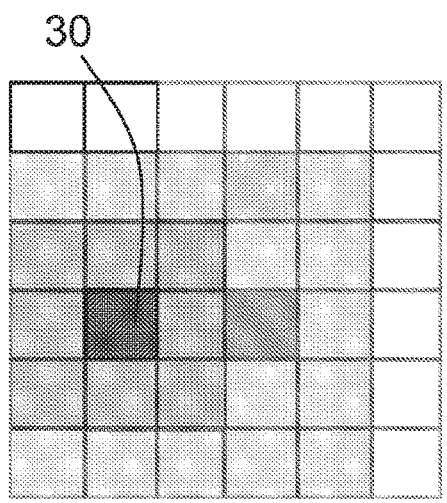
Figure 8D:
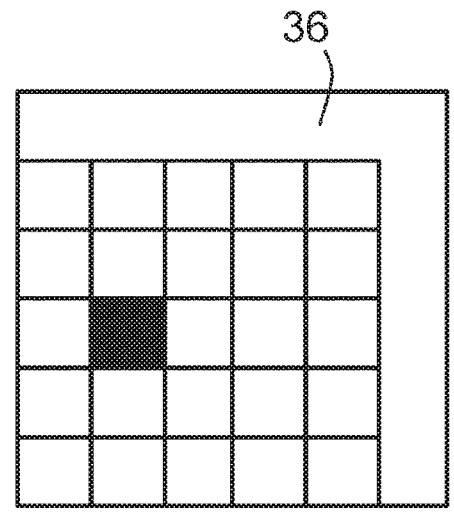
Figure 8E:
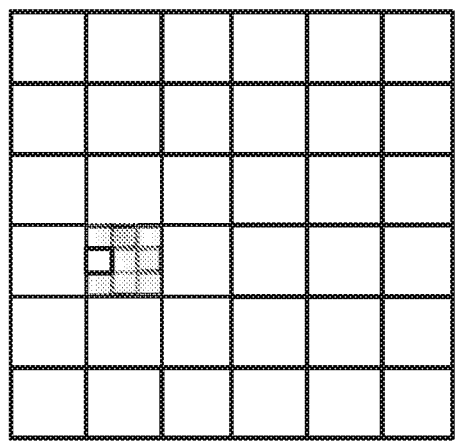
Figure 8F:
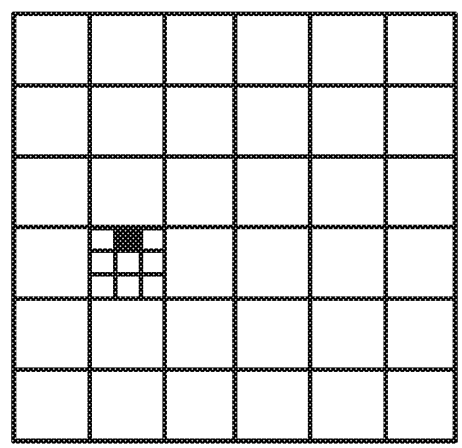

FIG. 8a shows after a first measurement that all cells are equally likely, according to the data available, to be the correct location. After further measurements (see FIG. 8b) the probability of the jamming source being in certain cells (for example cells 30 and 32 in FIG. 8b) is greater than in other cells (for example cells 34 in FIG. 8b). After further measurements (see FIG. 8c) the probability of the jamming source being in one cell (cell 30) is greater than all other cells, but not sufficiently high to have sufficient confidence that cell 30 is the correct location. After yet further measurements, (see FIG. 8d) the probability of the jamming source being in cell 30 is greater than a first threshold level and the probability of the jamming source being in any other cell is lower than a second threshold level. At this stage the jammer geo-location computation engine may deem the location of the jammer to correspond to the geographical area corresponding to cell 30. As a further (optional) development of the second embodiment, the geo-location computation engine may subsequently increase the precision of the detected location of the jammer, by sub-dividing cell 30 into smaller cells and repeating the above method (see representations shown in FIGS. 8e and 8f). As a further (optional) development of the second embodiment, the geo-location computation engine may reduce computational demands by ceasing subsequent calculations for any cell in which the probability of the jamming source being in that cell has previously been deemed to be lower than the second threshold level. For example, after the calculations have been performed that are represented by FIG. 8b the upper row or cells and the far right-hand column of cells (represented by the reference numeral 36 in FIG. 8d) may be discounted from further calculations.

Once the location of the source of the jammer signal is ascertained, the source may be observed, for example with a camera on-board the UAV or by other surveillance equipment. A secondary detection apparatus such as a video camera or infra-red imaging system may be used to confirm the identity and location of the source of the jammer signal. Such secondary detection apparatus may thus be used to confirm, possibly with manual confirmation from a "man-on-the-ground", the correct identification of the jammer signal source. Action may be taken to target and destroy the source of the jammer signal once the source is identified with confidence.

Figure 9:
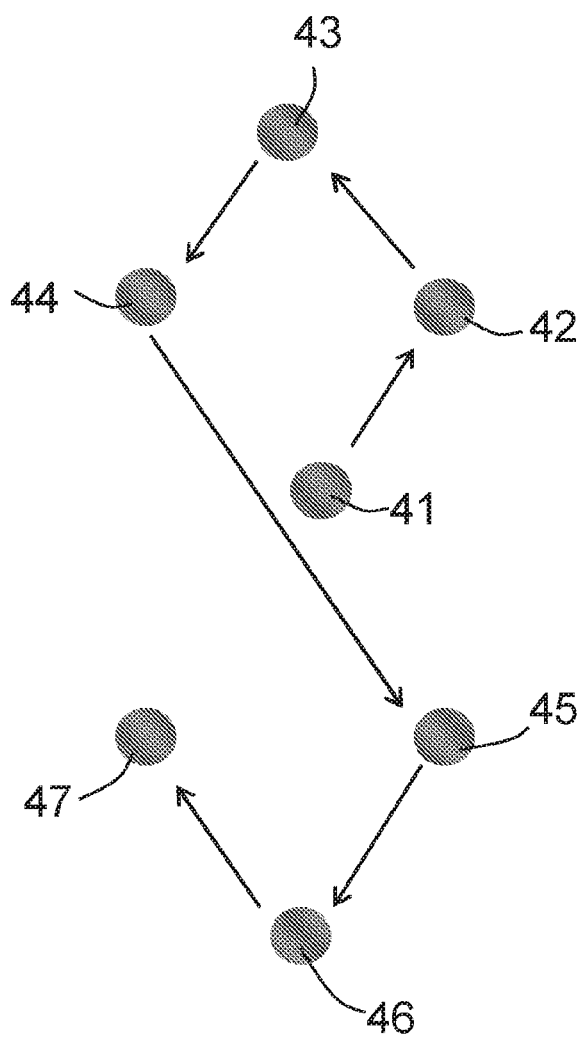
FIG. 9 shows the locations of first to seventh measurements made when performing a method of detecting a source of a GPS jammer signal according to a third embodiment of the invention.
Figure 10:
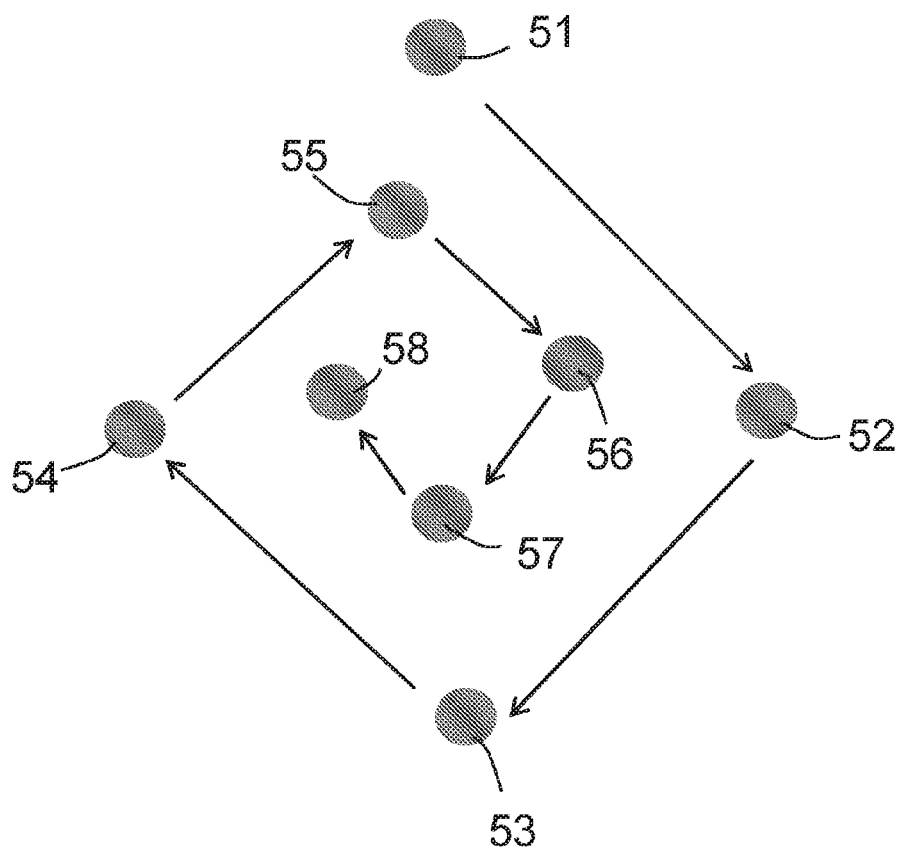
FIG. 10 illustrates schematically the locations of first to eighth measurements made when performing a method of detecting a source of a GPS jammer signal according to a fourth embodiment of the invention.

In third and fourth embodiments, illustrated schematically by FIGS. 9 and 10, the flight path of the airborne vehicle is chosen to be of a geometry suited to geo-locating a ground-based jammer. Flight paths which cover measurement locations being located at different positions relative to at least two orthogonal directions are suitable. Circular paths are readily implemented and suitable. A flight path including non-overlapping generally circular paths are preferable. A flight path including at least two generally circular paths with the centres of the circular paths being displaced is possible. A figure of eight path is particularly beneficial. Such a path is shown in FIG. 9, which shows schematically the locations of first to seventh measurement locations 41 to 47 (there may be measurements made between the points indicated in FIG. 9). Having generally circular paths of differing radii is also beneficial. It will be understood that the term circular is being used here to denote a path involving the vehicle travelling 360 degrees around an area, but will typically be a shape that is oval and non-symmetrical in other ways. A generally spiral path is another option. Such a path is shown in FIG. 10, which shows schematically the locations of first to eighth measurement locations 51 to 57 (there may be further measurements made between the locations indicated in FIG. 10).

A fifth embodiment will now be described with reference to FIG. 11 together with a more detailed explanation of the calculations that are carried out in an example embodiment of the invention. (It will be appreciated that the theories expressed here may be equally valid in relation to the other described embodiments and that similar calculations may be provided in the other embodiments). The method proposed is similar conceptually to those methods described above. The apparatus used when performing the method is shown schematically in FIG. 11, which shows a detector 120 that has a single antenna 122 arranged for detecting the strength of a GNSS jammer signal. The detector is connected to a computer processor 124. The antenna 122 of the detector 120 feeds signals to an analogue signal processing unit 162, which is connected to an analogue-to-digital (ADC) unit 164. Signal outputs from the detector 120 are fed to the computer processor unit 124. The computer processor unit 124 may be considered as comprising three principal modules: a measurements extraction and computation module 166, a jammer location and likelihood computation module 168, and a fly-path computation and prediction module 170.

The GNSS antenna 122 is responsible of receiving the jamming/spoofing signals in the sky in the corresponding GNSS spectrum bands. A generic GNSS antenna is suitable, although more specifically tailored antenna can improve the performance of this detection and localization system. One example of the specific characteristics of the antenna would for example be the gain pattern optimization based on the antenna geometry relative to the mounting platform. It is preferred that the antenna has uniform gain pattern over the "viewing angles". The antenna can be either active or passive. If an active antenna is used, the frequency response of the low noise amplifier (LNA) is preferred to be uniform over the frequency of the GNSS front end. Another aspect of the specification is the polarization of the antenna. In order to maximize the reception sensitivity of the jamming signals, the polarization is preferred to be the same as that of the jammer transmission antenna. For instance, the majority of the civilian jammers use a linear polarized transmission antenna instead of the right hand circularly polarized antenna in the case of GNSS satellites.

Figure 11:
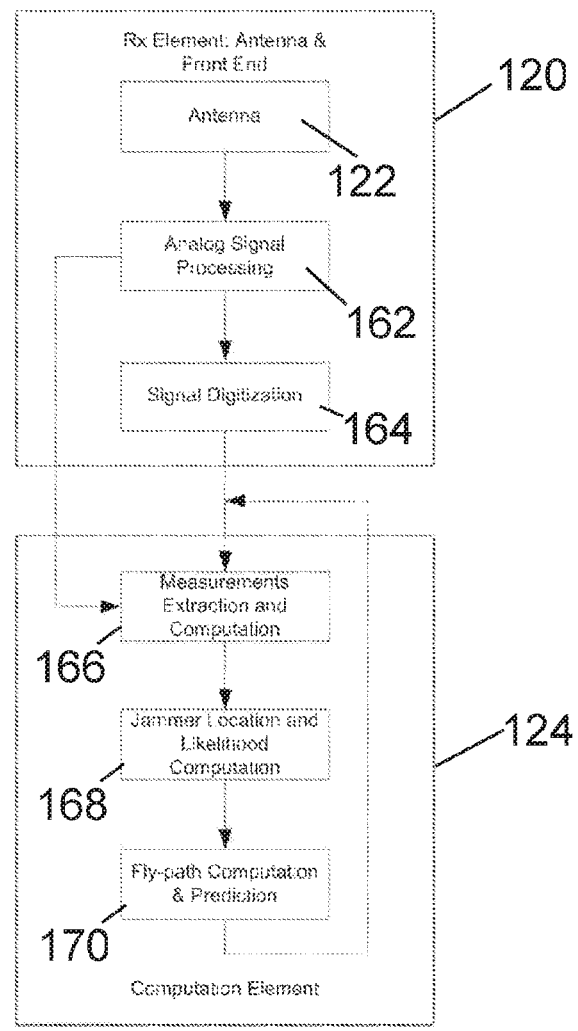
FIG. 11 is a block diagram of apparatus for performing a method of detecting a source of a GNSS jammer signal according to a fifth embodiment of the invention.

The analogue signal processing chain 162 shown schematically in FIG. 11 includes the electronic components that process the signal outputs from the antenna. Such signal processing includes amplification, filtering, and down conversion of the analogue signals. It can be a homodyne implementation, a heterodyne implementation or a super-heterodyne implementation. It is preferred that the amplification gain during this stage is kept constant when performing the method to detect a signal jammer. In a case where the gain changes, the details of such changes will ideally be known and made available so that the overall gain applied can be ascertained by the jammer signal power estimation engine.

The signal digitization unit 164 digitizes the output of the processed signals from the analogue signal processing chain 162, by the process of sampling and quantizing the analogue signal. The digital signals are then fed to the digital processing entities which are hosted on the computer processor unit 124.

The measurements, the received power and/or the time of arrival of the jammer signals, are extracted and computed based on the digital time series of the signal and the information from the receiver front end (i.e. from the detector 120). At each time instance, one power measurement or timing measurement or both is taken. The received power estimation is based on the digital sample level distribution (or histogram). In the case of the jammer signals whose time bearing information can be extracted, the partial time of arrival of the signal is computed. For instance, with a signal whose characteristics varies over time in an estimatable/predictable pattern, the time bearing information can be constructed in accordance to the corresponding characteristics. For instance, a jammer signal whose frequency variation follows a certain gradient and periodicity, the frequency estimated at the measurement instance can be used as the time bearing information. One measurement, either power or time, can be taken from one antenna 122 plus receiving front end chain. In the case where multiple chains (e.g. multiple detector circuits or multiple antennae) are available, one measurement can be taken from each chain at one instance. These measurements are then stored as well as fed into the jammer location computation engine 168.

The jammer location and likelihood computation engine 168 computes the position of the jammer location, as well as the corresponding likelihood, based on a series of previous measurements. The primary method is based on the received power measurements. Whilst it is not necessary in all embodiments of the invention, for the simplicity of description of the method of the present embodiment, the following assumptions are made:

Both the transmission antenna of the jammer and the reception antenna of the detector have an isotropic gain pattern Free line of site (LOS) between the jammer antenna and the detector antenna, without shadowing or multipath degradation, is present at the instances the power measurements are made The emission power of the jammer remains constant over the whole course of measurement-taking and jammer location computation The power measurements are assumed to be unbiased and Gaussian estimates of the true reception power One and only one jammer is present over the whole course of measurement-taking and jammer location computation Both the jammer and all the measuring locations are situated in a 2 dimensional space (this assumption in particular, is made purely for simplicity of the following description).

With these assumptions, one can define the ratio, $P_r/P_t$, of the received power $P_r$ and the transmitted power $P_t$ as:

$$\frac{P_r}{P_t} = G_t G_r \left(\frac{\lambda}{4\pi r}\right)^2$$

where, $G_t$ and $G_r$ are the gain of the receiving and transmission antennas respectively, $\lambda$ is the wavelength of the jammer signal, and r is the distance between the transmission and reception antennas. With the 2D assumption and constant power and gains assumption made above, this equation can be rewritten as:

$$P_{r,i} = \frac{K}{r_i^2} = \frac{G_t G_r \lambda^2 / (4\pi)^2}{(x_i - x_J)^2 + (y_i - y_J)^2} P_t$$

where $(x_i, y_i)$ are the 2D coordinates of the position where the i-th power measurement is made, K is a constant, and $(x_J, y_J)$ are the true jammer coordinates in the 2D space. The error of the power measurement is omitted in the equation to simplify the description, and will be re-instated and dealt with later. With two measurements at two different positions, one may compute the ratio between the two power measurements as follows:

$$\frac{P_{r,i}}{P_{r,j}} = \frac{r_j^2}{r_i^2} = \frac{(x_j - x_J)^2 + (y_j - y_J)^2}{(x_i - x_J)^2 + (y_i - y_J)^2} = \kappa_{ij}$$

This equation can be rewritten as:

$$(1-\kappa_{ij})x_J^2 + (1-\kappa_{ij})y_J^2 + 2(\kappa_{ij}x_i - x_j)x_J + 2(\kappa_{ij}y_i - y_j)y_J + (x_j^2 + y_j^2 - \kappa_{ij}x_i^2 - \kappa_{ij}y_i^2) = 0$$

whose solution of $(x_J, y_J)$ is a circle. When one more measurement is taken at $(x_k, y_k) \neq (x_i, y_i) \neq (x_j, y_j)$, another circle can be formulated by taking the power ratio between $P_{r,j}$ and $P_{r,k}$. These two circles are guaranteed to intercept at two points in a 2D space. These two points are the potential jammer location solutions. With the third measurement taken at a position that is not situated on the line determined by $(x_j, y_j)$, and $(x_k, y_k)$, i.e. the ranks of the system is 2, then a unique point is intercepted by all three circles, which is ultimately the solution of the jammer location. This process can keep evolving and one may find that all the circles determined by the above-mentioned process will intercept at one unique point.

The above mathematical method is easily extensible to a 3D case with one more measurement being required. One may also observe that, generally, when the independent measurements are more than the minimum required to solve the unknowns, the problem becomes an over-determined system. In real life measurements, noise and measurement errors will be present. Mathematic tools such as least square (LS) method or extended Kalman filter (EKF), can be used to solve the solution, when multiple measurements are made which are susceptible to errors, whether resulting from systematic errors, measurement noise, or otherwise, and in which case a unique single interception point might not exist.

The least square model formulation is introduced below. The relationship between the i-th measured received power at coordinate $(a_i, b_i, c_i)$, $P_i$, and the jammer transmission power J, can be formulated as:

$$P_i = \frac{J}{(x-a_i)^2 + (y-b_i)^2 + (z-c_i)^2} + e_i$$

where (x, y, z) is the unknown coordinates in a 3D space that needs to be solved, and $e_i$ is the noise term. This equation can be manipulated to:

$$P_i - e_i = f(x, y, z, J)$$

If an initial coarse estimation of the jammer coordinates is available, say $(x_0, y_0, z_0)$, the above equation can be re-written as:

$$P_i - e_i = f(x_0 - \Delta x, y_0 - \Delta y, z_0 - \Delta z, J_0 - \Delta J)$$

where $(\Delta x, \Delta y, \Delta z)$ are the correction to the coordinate estimate. Using the Taylor expansion up to the 1st derivative, one may obtain:

$$P_i - e_i = f(x_0, y_0, z_0, J_0) + \frac{\partial f(x_0, y_0, z_0, J_0)}{\partial x_0}\Delta x + \frac{\partial f(x_0, y_0, z_0, J_0)}{\partial y_0}\Delta y + \frac{\partial f(x_0, y_0, z_0, J_0)}{\partial z_0}\Delta z + \frac{\partial f(x_0, y_0, z_0, J_0)}{\partial J_0}\Delta J$$

With this computation, the original non-linear model is linearized and original problem is transformed to solve $(\Delta x, \Delta y, \Delta z)$.

Then the following terms can be computed based on the power measurements, the corresponding coordinates, and the initial coarse position of the jammer:

$$R_i = (x_0 - a_i)^2 + (y_0 - b_i)^2 + (z_0 - c_i)^2$$

$$P_0 = f(x_0, y_0, z_0, J_0) = \frac{J_0}{R_i}$$

$$\Delta P_i = P_i - P_o$$

$$A_i = -\frac{P_0}{R_i^2}(2x_0 - 2a_i)$$

$$B_i = -\frac{P_0}{R_i^2}(2y_0 - 2b_i)$$

$$C_i = -\frac{P_0}{R_i^2}(2z_0 - 2c_i)$$

$$D_i = \frac{1}{R_i}$$

With N measurements, the linear approximation of the original nonlinear least square problem can be represented as:

$$\begin{bmatrix} \Delta P_1 \\ \Delta P_2 \\ \Delta P_3 \\ \vdots \\ \Delta P_N \end{bmatrix} = \begin{bmatrix} A_1 & B_1 & C_1 & D_1 \\ A_2 & B_2 & C_2 & D_2 \\ A_3 & B_3 & C_3 & D_3 \\ \vdots & \vdots & \vdots & \vdots \\ A_N & B_N & C_N & D_N \end{bmatrix} \begin{bmatrix} \Delta x \\ \Delta y \\ \Delta z \\ \Delta J \end{bmatrix} + \begin{bmatrix} e_1 \\ e_2 \\ e_3 \\ \vdots \\ e_N \end{bmatrix}$$

This transformed problem now can be solved by either using all N measurements together when they are available based on the least square solution, or solved in a recursive way when each new measurement is available using the methods such as recursive least squares filter (RLS) or least mean squares filter (LMS). The advantage of latter is that the computation latency will be significantly reduced, and meanwhile taking advantage of all the previous measurements without significant computational overhead. This benefit may be particularly useful in some applications, where speed and computational efficiency are key.

One may also solve the original problem represented by $P_i - e_i = f(x, y, z, J)$ using the well-known extended Kalman filter (EKF) or other nonlinear estimation techniques such as particle filter.

So far, we assume the minimum intervention of the trajectory of the measurement points. In case the trajectory of the measurements can be adjusted on-the-fly, it is possible to guide the "next move" of the detector platform to optimize the jammer location process in terms of rapid convergence of solutions and larger likelihood of a position fix. The adjustment/determination of the "next move" may be achieved by having a so called "man-in-the-loop" approach or completely automated process in which the computed likelihood of location is used to dictate or alter the next planned location for the next measurement to be made. As mentioned above, the i-th measured received power at coordinate $(a_i, b_i, c_i)$, $P_i$ can be expressed as follows:

$$P_i = \frac{J}{(x - a_i)^2 + (y - b_i)^2 + (z - c_i)^2} + e_i$$

With the initial N measurements, a search process may be performed for all the possible coordinates over a certain grid with a certain granularity. The magnitude of the error term corresponding to each of those searched candidate coordinates is computed, and a likelihood quantity is derived for all these grid points. This information is then fed back to the guidance system to adjust the fly-path for the next move based on the criterion that the variance of the likelihood is minimized with the addition of one more measurement.

In a sixth embodiment, not separately illustrated, the detector has two antennae, allowing direction information to be ascertained from a single measurement by the detector. (see U.S. Pat. No. 7,233,284 for a suitable implementation). Having multiple antennae may be beneficial in certain applications and may allow for precise location information to be ascertained faster. Multiple antennae are also of use in the case where multiple jammer sources are present over a relatively small geographical area. Multiple antennae also allow for time difference of arrival and the signal strength differences to be calculated from measurements made at the same instant in time. In such cases, the detector contains a time keeping system that is capable of synchronizing multiple measurements over time.

In a seventh embodiment, not separately illustrated, the geo-location computation engine of the detector includes a database of known jammer characteristics (classifying types of jammer signals by their "signature" characteristics and the geo-location computation engine is programmed to detect the type of jammer signal from its signature by comparing the characteristics measured with those stored in the database. This further assists the operator of the detection system as to the severity and type of jammer in use and therefore assists the operator in deciding the priority of whether to deal with it, as well as building up a map of known target types in operation. The signature of a jamming signal can be identified by analysing a spectrogram of amplitude/energy at various frequencies. Certain jamming signals can have characteristics such that relative time of arrival information may be extracted from the jamming signal (for example the jamming signal may include a periodic component that is reliably detectable and can thus effectively be used by the geo-location computation engine as a timing signal in the jamming signal. The geo-location computation engine can then extract relative time of arrival information from the measurements made at the different locations by means of correlating the effective timing signal in the jamming signal and the time keeping system of the detector. Such information can further assist in precisely and efficiently geo-locating the source of the jamming signal.

The above described embodiments will typically provide the best results when the following (preferable yet not essential) conditions are present:

The jammer signal exhibits isotropic and constant power emission levels over the measurement-taking frequency range;

There is uniform antenna gain patterns at jammer and at detector antenna; and

There are clean signals at detector and jammer (e.g. no obstructions or multipath effects).

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Whilst the embodiments describe detection of GPS jamming signals, the same principles could equally be applied to detecting jamming signals designed to disrupt other navigation or communication systems, such as GLONASS jammers and GSM (the globally-recognised standard for mobile communications—"Global System for Mobile Communications" or "Groupe Spécial Mobile") jammers.

The processing of data received by the measurements made by the detector can be all processed in real-time. Some (or all) data could alternatively be post-processed.

The detector could be adapted to detect more than one source of jamming signal at a time.

The grid used to assess probability of the location of the jammer within a particular cell does not need to be regular. It can consist of irregular grid spacings. The cells do not need to be rectangular or square in shape. Cells may overlap other cells.

The detector may be adapted to cope with jammer signals having non-isotropic power levels.

The detector may be adapted to cope with non-uniform antenna gain patterns.

The embodiments described may operate assuming a constant altitude of flight of the UAV. Alternatively, the principles may readily be extended to cater for a detector platform which has a varying altitude.

Other platforms for the detector are envisaged. The detector could be used on a ground-based vehicle. The detector could be incorporated into the sensor equipment on a missile. A loitering missile is a particularly suitable platform for utilising the detector of the present invention. When the detector is mounted on or in a missile, the missile can be used as the means for destroying the jammer if and when correctly identified.

It will be seen that the illustrated embodiments have in common that a jamming signal method and detector therefore is provided. Generalising, embodiments of the present invention provide a method of locating a source, preferably a ground-based source, of a jamming signal; for example, a jamming signal being one capable of disrupting a satellite-based navigation system—or Global Navigation Satellite System ("GNSS")—such as GPS, or Galileo. The method comprises steps of using a detector at a first location to make one or more measurements of one or more characteristics of the jamming signal, moving the detector from the first location to a second location, using the detector at the second location to make said one or more further measurements, and using measurements made by the detector of the one or more characteristics of the jamming signal to determine the location of the source of the jamming signal.

Thus, multiple spatially-separated and time-separated measurements may be made with the same single detector and then used to determine the location of the source of the jamming signal. A much simpler detector may thus be used. The detector need use only one antenna to make such measurements. The detector must however be moved from one position to the next during performance of the method, but requiring such movement is not considered to be a disadvantage in many applications where the detector is in any case carried by, or otherwise integrated in, a moving vehicle.

Advantageously the method includes a step of choosing, preferably positively (i.e. actively) choosing, the second location, preferably in a way that assists with the effective determination of the location of the source of the jamming signal. The source of the jamming signal will often be located on the ground. There is thus also provided a method of locating a ground-based source of a jamming signal, wherein the method comprises the above-described steps of using the detector at the first and second locations to make the measurements of the jamming signal and using those and/or other measurements to determine the location of the source of the jamming signal, in which method there is a step of choosing the second location and then moving the detector from the first location to the second location.

The step of choosing the second location for the detector may be effected by means of the detector having a pre-set path of movement. The path of movement may be shaped to provide a multiplicity of locations spaced apart in at least two orthogonal directions. One and preferably both of those two orthogonal directions may be transverse to line between the first location and the likely position of the jamming signal. For example, in the case of an airborne detector seeking the location of a ground-based jamming signal the two orthogonal directions may be substantially horizontal. The path of movement may be shaped to provide a multiplicity of locations sufficiently spaced apart in at least two orthogonal directions for measurements from such locations to be sufficient for locating the position of the source of the jamming signal. A path including movement in the general form of a figure of eight is one such possible path. A path including generally circular or spiral movement is another possibility. The path may include movement along at least two different curved paths, the detector when moving along each curved path undergoing rotational movement of more than 270 degrees. There may be a step in the method of actively setting the pre-set path, such a step being performed before the performance of the steps of locating the detector in the first and second locations. The setting of the pre-set path may pre-set the shape of the path. The setting of the pre-set path may pre-set the size of the path. The setting of the pre-set path may pre-set the position and orientation of the path. The setting of the pre-set path may be performed such that all locations at which measurements are to be made are uniquely defined in three dimensions. The setting of the pre-set path may be performed such that its shape size position and orientation are all uniquely defined in three dimensions.

The step of choosing the second location for the detector may be effected in dependence on one or more previous measurements made by the detector. For example, the second location may be chosen in dependence on the location judged to be the most likely position of source of the jamming signal. The second location may be chosen so as to enable discrimination between two or more locations judged to be possible positions of the source of the jamming signal. Again, the measurements may be made at a multiplicity of locations spaced apart in at least two orthogonal directions. As mentioned above, one and preferably both of those two orthogonal directions may be transverse to line between the first location and the likely position of the jamming signal. The measurements are preferably made at a multiplicity of locations sufficiently spaced apart in at least two orthogonal directions for measurements from such locations to be sufficient for locating the position of the source of the jamming signal. The second location may be chosen by or under the control of a manual operator, who is able to control or direct movement of the detector. Such a manual operator may be referred to as a Man In The Loop ("MITL"). The second location may be chosen automatically by a way-point model based on previous measurements (but, optionally, being monitored by a MITL for safety). Such an automatic calculation (of the next location from which a measurement is to be made) may be an "on the fly" calculation which determines a beneficial location for the next measurement, using a probability estimate of the likely location of the jamming signal source, and taking into account any constraints that might be placed on possible next positions for the detector (for example, the detector platform may be an airborne vehicle having a set flight path which can only be varied within certain mission constraints). There may be a step of choosing a third location in dependence on one or more previous measurements made by the detector, such a step optionally being as described above in relation to the step of choosing the second location in dependence on prior measurements. A fourth location, and optionally further locations, may be chosen in a similar manner.

It will be appreciated that measurements may additionally be made between the first and second locations and that measurements may have been made by the detector before the making of the measurements from the first location. Certain embodiments of the invention thus provide a method of locating a ground-based source of a jamming signal, wherein the method comprises the following steps:

using a detector at a first location to make one or more measurements of one or more characteristics of the jamming signal, in dependence on the measurements so made, choosing a second location from which one or more further measurements of one or more characteristics of the jamming signal are to be made by the detector, moving the detector from the first location to the second location, using the detector at the second location to make said one or more further measurements, using measurements made by the detector of the one or more characteristics of the jamming signal to determine the location of the source of the jamming signal.

Embodiments of the invention may have application in relation to wide band threat detection. The method has particular application within the L-band of the GPS system. (Typically GPS systems use two frequencies: the "L1" frequency at 1575.42 MHz, and the "L2" frequency at 1227.6 MHz.) Other GNSS constellation jammers/interferers (i.e. not just GPS threats) may also be detected with the method. For example the method may be used to detect jammers of GLONASS (GLObalnaya NAvigatsionnaya Sputnikovaya Sistema) or Galileo signals. The range of frequencies of jammers to be detected by the method may be within the band extending from about 300 MHz to about 3 GHz, and preferably from about 900 MHz to about 2,200 MHz. Of course, the method could be extended to detect a signal having a frequency outside such ranges, and may have application in geo-locating signals, not necessarily being jamming signals, at other frequencies. Typically such a signal will be within the range from about 3 MHz to about 30 GHz.

It may be that a signal processing unit, such as for example a computer, performs the step of choosing the second location in dependence on the measurements made by the detector from the first location.

It may be that a signal processing unit, such as for example a computer, determines the location of the source of the jamming signal by using the measurements made by the detector.

It may be the same signal processing unit/computer that both performs the step of choosing the second location and determines the location of the source of the jamming signal.

There may be a step of moving the detector to a third location, different from the first and second locations. The detector may be used at such a third location to make yet further measurements of one or more characteristics of the jamming signal. There may be further multiple steps of moving the detector to further locations and making further measurements. There are preferably at least five such different locations from which measurements are made with the detector. Each such further location, for example including the further location, may be chosen (i.e. purposefully selected) for the purposes of improving the ability to locate accurately and precisely the location of the jamming signal. It may be that the third location is chosen such that it is displaced from the straight line passing through both the first and second locations. The choice of the various locations from which the measurements are made may, as mentioned above, be chosen in the sense that a path of movement is chosen. Such a path may be chosen specifically to improve the ability to locate accurately and precisely the location of the jamming signal. This first, second and third locations, and optionally fourth and possibly further location, may be sufficiently spaced apart in at least two orthogonal directions for measurements from such locations to be sufficient for locating the position of the source of the jamming signal.

The one or more characteristics of the jamming signal measured by the detector may include an indication of the strength of the jamming signal detected (for example, the detected power of the jamming signal detected at one or more frequencies). The measurements made by the detector of the strength of the signal as measured at a multiplicity of different locations may then be used to determine the location of the source of the jamming signal. Triangulation techniques may be used to determine the location of the source of the jamming signal. The method may be performed such that the determining of the location of the source of the jamming signal is primarily based on the use of the multiple measurements of the strength of the signal (for example using an indication of signal power) as measured at a multiplicity of different locations. In such a case, such multiple measurements will provide sufficient information to determine the location of the jamming signal. There may therefore be no need to measure the angle of direction of the incident radiation at the detector. A direction antenna may not therefore be required as part of the detector in order to perform the method. It may be that the use of such a direction-finding antenna could improve the accuracy and/or precision of the determining of the location of the jamming signal, however. The method may include causing the detector to perform the step of making a measurement of the jamming signal at a rate of at least once per second. The method may include causing the detector to make successive measurements of the jamming signal at locations that are spaced apart by a distance of more than 1 m. The successive locations may be spaced apart by a distance of more than 10 m. The successive locations may be spaced apart by a distance of more than 20 m. The successive locations may be spaced apart by a distance of less than 500 m, and preferably less than 200 m, and may optionally be less than 100 m.

The method may comprise a step of confirming the location of the source of the jamming signal with the use of a secondary detector which measures characteristics of the source of the jamming signal other than characteristics of the jamming signal itself. For example, the secondary detector may be able to recognise or confirm the source of the jamming signal from the source's heat signature. The secondary detector may be able to recognise or confirm the source of the jamming signal from its visual appearance. The secondary detector may comprise a camera. The camera may be a video camera. The secondary detector may comprise an infra-red imaging sensor. The method may comprise a step, once a predicted location of the source of the jamming signal has been calculated from the measurements made by the detector, of confirming with use of an imaging sensor (for example a camera) the location of the source of the jamming signal by means of directing the imaging sensor to view the predicted location so calculated. A camera advantageously offers the ability to observe the jammer, preferably at a suitable stand-off distance, offering visual verification of the jammer source to a MITL. Such visual verification may be used to authorise engagement of the threat (e.g. the source of the jamming signal) for removal. Thus, it will be seen that the method provides an optional step, once the location of the source of the jamming signal has been ascertained, of actively stopping the jamming signal. The jamming signal source may thus be targeted and destroyed.

The method may include an initial step of detecting a jamming signal at a particular frequency or within a particular frequency band.

There may be a step of using measurements made by the detector of the one or more characteristics of the jamming signal to detect the type of jamming signal. Measured characteristics of the jamming signal may be compared against a database of types of jamming signal classified according to such characteristics. In embodiments of the invention it may thus be possible to identify the signature of the jammer. This may further assist an operator or MITL in ascertaining the severity and type of jammer in use and therefore assist with prioritising if and when to deal with it. A map of known target types (types of jammer, for example) in operation may additionally or alternatively be created.

Above, it is mentioned that the detector need use only one antenna to make the measurements needed to locate the source of the jamming signal. There may however be advantages in using multiple antennae. Both signal time of arrival and signal strength variation can be measured and used when using a multiple antenna detector system. When the detector is at the first location one or more characteristics of the jamming signal may be measured by means of two spatially separated antennae associated with the detector. The time difference of arrival and/or the signal strength difference at the multiple antennae may be used as further measurements to locate the jammer source and/or improve the accuracy and/or precision of deemed location.

Time of arrival information may be extracted, optionally by a single detector having only one antenna for such measurements, in a case where the jamming signal exhibits suitable characteristics. For example, if the jamming signal is periodic and the periodicity is known, or can be ascertained, a single antenna may be able to make spatially and temporally separated measurements from which time of arrival differences may be calculated. Suitable jamming signals include chirp signals, and CDMA (code division multiple access) signals (for instance, a spoofer) for example. Thus, if the jamming signal has characteristics such that relative time of arrival information may be extracted from the jamming signal, the method may include a step of extracting relative time of arrival information from the measurements made at the first and second locations. Such information may then be used when determining the location of the source of the jamming signal.

The method may include notionally dividing a space covering the possible location of the source of the jamming signal into a multiplicity of cells. The measurements made by the detector may be used to calculate for each cell a probability of the jammer signal source being located in that cell. The method may include repeating the making of measurements with the detector. The method may include repeatedly updating the probabilities allocated to the cells. The probabilities may be updated until a threshold of confidence is reached at which the location of the jammer source can confidently be predicted as being in a cell or in one of a small number of cells grouped together. The method may include outputting a prediction of the location of the jammer source as being in a cell or in one of a plurality of cells grouped together, for example only after a certain level of confidence is reached. If the cells represent relatively large geographical areas, then the method may require that there is sufficient confidence that the jammer source is in one cell and no other. If the cells represent relatively small geographical areas, then there may only need to be sufficient confidence that the source is one of a sufficiently small number of cells that are grouped together. The cells are conveniently arranged in a uniform grid. The cells may represent a 2-dimensional map of the ground, which will for most purposes be sufficient for locating a signal jammer that is ground-based. The cells may be arranged in 3-dimensions, to allow for location of signal jammers not necessarily located on the ground.

The method may be so performed that once the probability of the source of the jamming signal being located within a given cell falls below a threshold, it is assumed with confidence that the location of the jammer source is not in that cell. Subsequent probability calculations for the remaining cells can be repeated whilst omitting the one or more cells discounted as being sufficiently improbable locations of the jammer. The computation requirements for performance of the method can thus be reduced.

The size of the cells may be reduced during subsequent calculations thus allowing the probable location of the source of the jamming signal to be located more precisely.

Embodiments using the technique described above, using such cells, may be such that they are considered as assembling a "probability of geo-location" map based on in-use measurements of the jammer signal by the detector. The construction of the probability map may be based on initially identifying a coarse approximate location of the jammer source based on initial detection of the jammer signal. The approximate location may be used as a centre point to formulate a grid of potential jammer locations (similar to the cells mentioned above). The grid can be a regular or irregular shape. It can consist of regular or irregular grid spacings. Each grid point may be considered as a potential location of the jammer. The method of such an embodiment may be such that each grid point is analysed to determine the likelihood that the jammer is located at the point. The grid may then be recomputed and refined over a series of measurements from the detector until the most likely one or more candidate locations are identified. The method of such an embodiment may be such that when sufficient measurements with sufficient geometrical variation are made, the most likely location emerges. It will be appreciated that the locations from which the detector makes a future measurement may be chosen in dependence on the calculated probability of the jammer signal source being located in a given cell (or cells). The method may include repeating the making of measurements with the detector, for example in dependence on the probabilities allocated to the cells.

The detector may form part of a vehicle. The detector may be carried by a vehicle. The detector may be mounted on or in a vehicle. The vehicle may be an airborne vehicle. The vehicle may be a ground-based vehicle. The vehicle may be a marine vehicle. The vehicle may be one that is moving at a speed greater than 10 ms$^{-1}$. The vehicle may be constantly moving during performance of the method. The vehicle may be an unmanned vehicle. The vehicle may be a UAV (i.e. an "Unmanned Air Vehicle". The vehicle may have a speed of between 25 ms$^{-1}$ and 100 ms$^{-1}$. The vehicle may be a missile. The missile may be a loitering missile. The vehicle may be an airborne vehicle having a speed of at least 100 ms$^{-1}$. The speed of the vehicle may exceed Mach 0.5. The speed of the detector platform (e.g. the vehicle) may be such that the jammer platform can be assumed to be pseudo-static in relation to the detector platform. The detector platform may be able to position itself such that the jammer does not impact on the ability of the detector platform to use the satellite-based navigation system that the jammer seeks to disrupt. The detector platform may be able to position itself such that the jammer does not impact on the ability of the detector platform to reposition itself. The detector platform may be provided with means of geo-locating itself without reliance on the satellite-based navigation system that the jammer seeks to disrupt.

One, more than one, or all of the steps of the method requiring numerical calculations may be conducted with the use of a computer, preferably one directly associated with or forming a part of the detector.

As mentioned above, there may be a step of targeting and destroying the source of the jamming signal. There may be a step of observing the source of the jamming signal. The step of targeting the jamming signal source may be performed by a vehicle carrying the detector. The step of destroying the jamming signal source may be performed by the vehicle carrying the detector. The step of observing the jamming signal source may be performed by the vehicle carrying the detector.

There is also provided a detector configured for use in any of the aspects of the method of the invention as described or claimed herein. The detector may comprise at least one antenna for measuring one or more characteristics of a jamming signal. The detector may comprise a plurality of such antennae. The detector may be associated with or comprise a computer and/or signal processing unit for using measurements made by the detector to determine the location of the source of the jamming signal. The detector may be associated with or comprise a computer and/or signal processing unit for choosing a location at which the detector should make the next measurement(s) of the jamming signal. The detector may be provided on or in, or otherwise part of, a vehicle arranged, for example to perform methods of any of the aspect of the methods described or claimed herein. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of locating a ground-based source of a jamming signal capable of disrupting a satellite-based navigation system, wherein the method comprises using a detector at locations on a path to make measurements of one or more characteristics of the jamming signal, the method comprising the following steps:
    using the detector at a first location on the path to make one or more of the measurements;
    choosing a second location on the path from which one or more further of the measurements are to be made by the detector;
    moving the detector from the first location to the second location;
    using the detector at the second location to make said one or more further measurements;
    choosing a third location on the path from which one or more yet further of the measurements are to be made by the detector, the third location being displaced from the straight line passing through both the first and second locations;
    moving the detector to the third location;
    using the detector at the third location to make the one or more yet further measurements;
    calculating at least one other location based on one or more of the previous measurements made by the detector from which one or more additional of the measurements are to be made;
    moving the detector to the at least one calculated other location;
    using the detector at the at least one calculated other location to make the one or more additional measurements; and
    using measurements made by the detector of the one or more characteristics of the jamming signal to determine a location of the source of the jamming signal.

2. A method according to claim 1, wherein the steps of choosing the second and third locations are effected by means of the detector having a pre-set path of movement shaped to provide a multiplicity of locations spaced apart in at least two orthogonal directions.

3. A method according to claim 2, wherein the pre-set path of movement includes movement along at least two different curved paths, the detector undergoing rotational movement of more than 270 degrees.

4. A method according to claim 1, wherein the steps of choosing the second and third locations are effected in dependence on one or more previous measurements made by the detector and such that the first, second and third locations are spaced apart in at least two orthogonal directions.

5. A method according to claim 4, wherein the third location is chosen in dependence on the location judged to be the most likely position of source of the jamming signal.

6. A method according to claim 1, wherein the measurements made by the detector include the strength of the jamming signal and the measurements made by the detector of the strength of the signal as measured at a multiplicity of different locations are used to determine the location of the source of the jamming signal.

7. A method according to claim 1, wherein the measurements are made at a multiplicity of locations sufficiently spaced apart in at least two orthogonal directions for measurements from such locations to be sufficient for locating the position of the source of the jamming signal.

8. A method according to claim 1, wherein the method further comprises a step of confirming the location of the source of the jamming signal with the use of a secondary detector which measures characteristics of the source of the jamming signal other than characteristics of the jamming signal itself.

9. A method according to claim 1, wherein when the detector is at the first location one or more characteristics of the jamming signal are measured by means of two spatially separated antennae associated with the detector.

10. A method according to claim 1, wherein the jamming signal has characteristics such that relative time of arrival information may be extracted from the jamming signal and the method includes a step of extracting relative time of arrival information from the measurements made at the first and second locations and using such information when determining the location of the source of the jamming signal.

11. A method according to claim 1, wherein the method includes:
    notionally dividing a space covering the possible location of the source of the jamming signal into a multiplicity of cells,
    using the measurements made by the detector to calculate for each cell a probability of the jammer signal source being located in that cell,
    making successive further measurements with the detector at different locations and updating after each successive further measurement the probabilities allocated to the cells, and
    predicting the location of the jammer source as being in a cell or in one of a plurality of cells grouped together after a certain level of confidence is reached.

12. A method according to claim 11, wherein
    once the probability of the source of the jamming signal being located within a given cell falls below a threshold, the location of the jammer source is assumed not to be in that cell, and, consequently the step of updating the probabilities allocated to the cells after subsequent measurements is performed only in respect of the remaining cells after omitting the one or more cells discounted as being sufficiently improbable locations of the jammer.

13. A method according to claim 1, wherein the detector forms part of, or is carried by, an airborne vehicle moving at a speed greater than 10 meters per second.

14. A method according to claim 1, further comprising a step of targeting and destroying the source of the jamming signal.

15. An apparatus comprising:
    a detector for measuring one or more characteristics of a jamming signal capable of disrupting a satellite-based navigation system;
    a processor; and
    a memory storing a jammer location and likelihood computation module and a fly-path computation and prediction module, the processor when executing the jammer location and likelihood module and the fly-path computation and prediction module is configured to:
    choose a fly-path comprising a first location, a second location, a third location and at least one further location;
    receive detection results from the detector from the first location, the second location, the third location and the at least one further location, the detection results indicating measurements of the one or more characteristics of the jamming signal at respective locations, wherein the at least one further location is calculated based one or more previous detection results; and
    determine a location of a ground-based source of the jamming signal from the detection results.

16. An airborne vehicle comprising
    a detector for measuring one or more characteristics of a jamming signal capable of disrupting a satellite-based navigation system;
    a processor; and
    a memory storing a jammer location and likelihood computation module and a fly-path computation and prediction module, the processor when executing the jammer location and likelihood module and the fly-path computation and prediction module is configured to:
    choose a fly-path comprising a first location, a second location, a third location and at least one further location;
    receive detection results from the detector from the first location, the second location, the third location and the at least one further location, the detection results indicating measurements of the one or more characteristics of the jamming signal at respective locations, wherein the at least one further location is calculated based one or more previous detection results; and determine a location of a ground-based source of the jamming signal from the detection results.

17. A method according to claim 11, wherein once the location of the jammer source has been predicted to be in a cell, the method further increases the precision of the detected location of the jammer source by sub-dividing the cell into smaller cells and repeating the method of claim 11.

\* \* \* \* \*